United States Patent [19]

Deemer et al.

[11] Patent Number: 5,368,524
[45] Date of Patent: Nov. 29, 1994

[54] ADJUSTABLE PULLEYS FOR MAIL SORTING SYSTEM

[75] Inventors: Diane L. Deemer, Columbia; Daryl S. Mileaf, Jessup, both of Md.

[73] Assignee: Westinghouse Electric Corporation, Pittsburgh, Pa.

[21] Appl. No.: 103,003

[22] Filed: Aug. 6, 1993

Related U.S. Application Data

[62] Division of Ser. No. 766,739, Sep. 27, 1991, Pat. No. 5,261,859.

[51] Int. Cl.$^5$ .............................................. F16H 7/12
[52] U.S. Cl. .................................. 474/133; 474/135; 271/34
[58] Field of Search ............... 474/107, 108, 109, 112, 474/130, 132, 133, 135; 271/34, 35

[56] References Cited

U.S. PATENT DOCUMENTS

| | | | |
|---|---|---|---|
| 3,863,517 | 2/1975 | Pareja | 474/112 |
| 4,270,906 | 6/1981 | Kraft et al. | 474/101 X |
| 4,507,104 | 3/1985 | Clark et al. | 474/112 |
| 4,532,844 | 8/1985 | Chang et al. | 474/112 X |
| 4,568,318 | 2/1986 | Johnson et al. | 474/112 |
| 4,966,571 | 10/1990 | de Guillebon | 474/112 X |

Primary Examiner—Roger J. Schoeppel

[57] ABSTRACT

A tension release mechanism for use with a dancer pulley assembly includes a first horizontal plate having an upper surface and a lower surface, a swing arm having a first end pivotally mounted to the first horizontal plate on the lower surface thereof and being pivotal about a vertical pivot axis A, a second horizontal plate having an upper surface and a lower surface and being spaced vertically above the first horizontal plate by at least one vertical support, a pulley shaft having an upper end and a lower end, the lower end being mounted on the second end of the swing arm and extending upwardly through an arcuate opening formed in the first horizontal plate, a dancer pulley rotatably mounted on the pulley shaft between the first and second horizontal plates for rotation about a vertical rotation axis B and being swingable on the swing arm through an arc defined by a distance between the pivot axis A and the rotation axis B, a guide for guiding the upper end of the pulley shaft during swinging motion of the dancer pulley, and a mechanism for adjusting the guide to maintain a substantially vertical orientation of the rotation axis B.

3 Claims, 5 Drawing Sheets

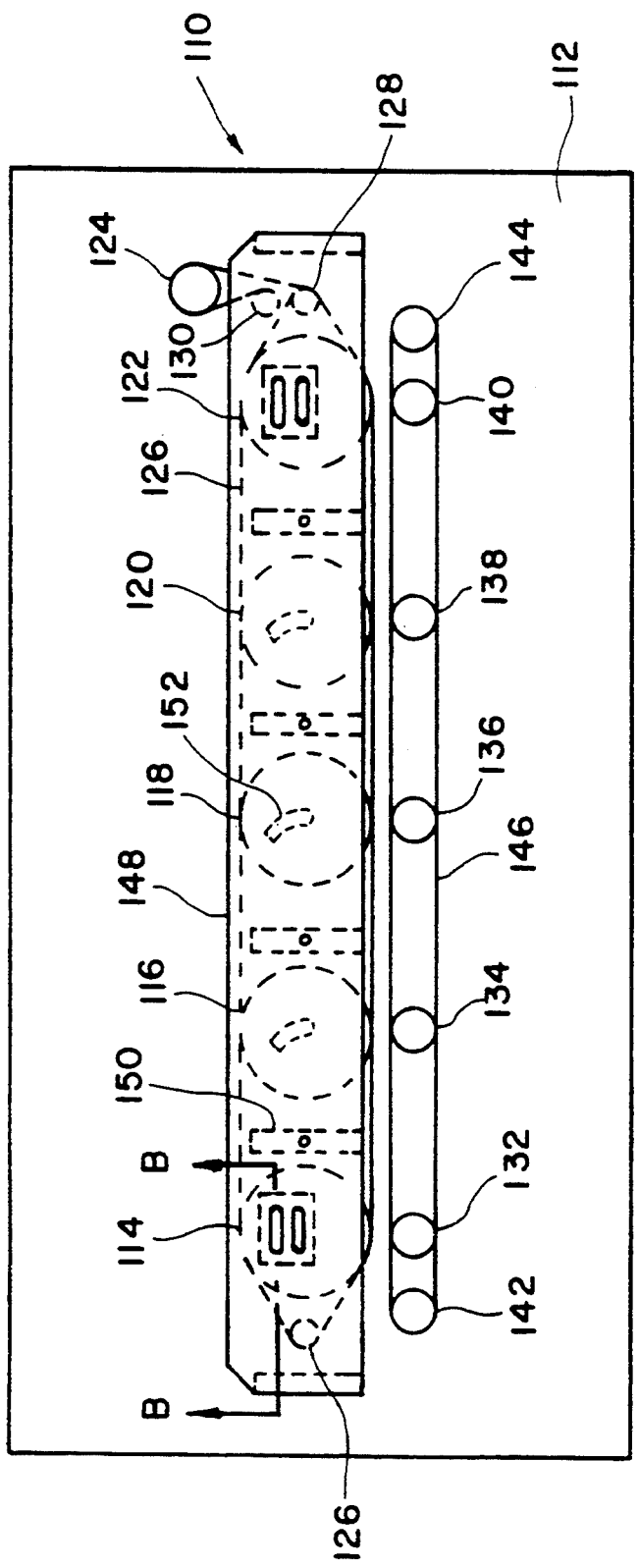

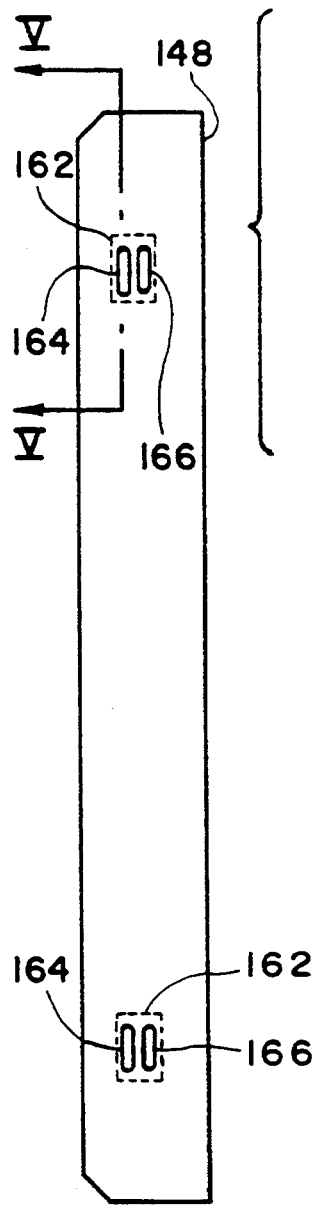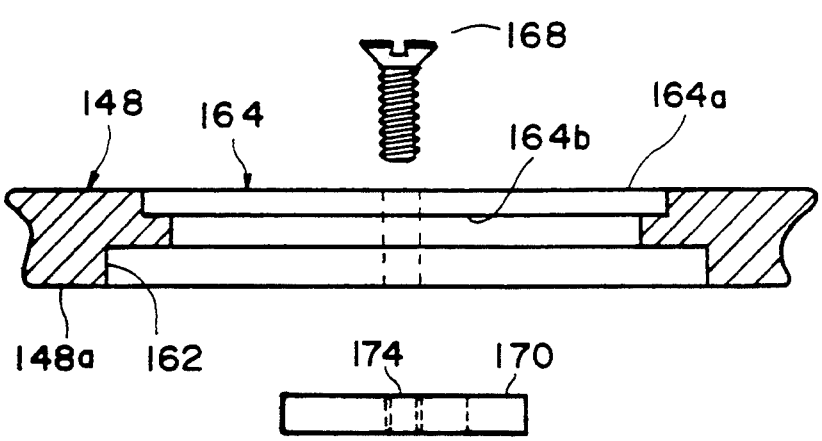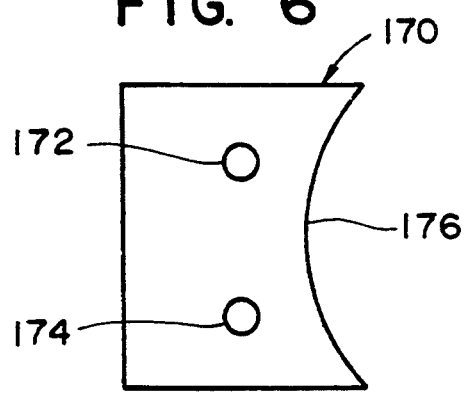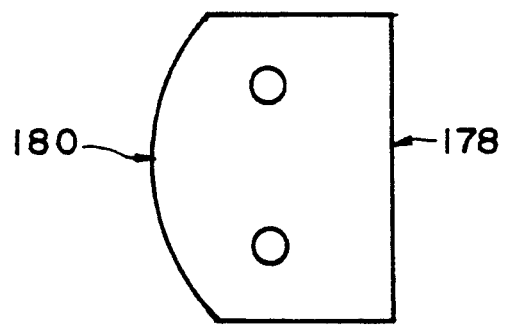

ADJUSTABLE PULLEYS FOR MAIL SORTING SYSTEM

This is a division of application Ser. No. 07/766,739 filed Sep. 27, 1991, U.S. Pat. No. 5,261,859.

BACKGROUND OF THE INVENTION

1. Field of the Invention

The present invention relates generally to mail sorting machinery and, more specifically, to adjustably pulleys for use in a mail induction subsystem which delivers mail to a transport/stacker module of a mail sorting system.

2. Description of the Related Art

A mail induction subsystem delivers pieces of mail individually to a transport/stacker module. The induction subsystem can include a number of separate modules, which collectively define a continuous delivery line for delivering mail to the transport/stacker module.

Each module of the induction subsystem may include one or more pulley assemblies which carry vertically oriented conveyor belts.

In order to accommodate mail pieces of variable width, the assignee of the present invention, Westinghouse Electric Corporation, has developed an induction subsystem which uses dancer pulleys in each pulley assembly of the induction subsystem to allow radially outward deflection of the pulleys, thus permitting wider pieces of mail to pass through counter-rotating vertical belts. The assignee's co-pending application, entitled "Induction Subsystem for Mail Sorting System" by Wakamiya et al., filed on Aug. 9, 1991, Ser. No. 07/742,752, abandoned, is incorporated herein by reference. Generally, as described in the aforementioned patent application, and as herein illustrated in FIG. 1 and 2, an induction line pulley assembly 32 includes a plurality of dancer pulleys 34, 36, 38, 40 and 42 which swing about respective axes 34a, 36a, 38a, 40a and 42a through a range of about 20°. A belt 44 runs over the surface of the dancer pulleys and is looped around two end pulleys 46 and 48 which have rotation axes coplanar with the rotation axes of the dancer pulleys when the dancer pulleys are in the normal position. The belt 44 is driven by a drive pulley 52, and an idler pulley 56 ensures at least 180° wrap of the belt 44 on the drive pulley 52. Also, the location of the idler pulley 56 is such that the belt geometry at the end pulley 48 is substantially the same as the end pulley 46.

A counter-rotating belt 58 runs between end pulleys 60 and 62, of which pulley 60 is driven, with idler pulleys 64, 66, 68, 70 and 72 therebetween. Preferably, drive pulleys 52 and 60 are driven in opposite directions by a common drive belt which runs from a drive motor so that the belts 44 and 58 rotate at the same speed but in opposite directions.

Each dancer pulley is supported on a corresponding swing arm 74, 76, 78, 80 and 82, respectively, each of which is pivotally mounted to a horizontal plate 84. The plate 84 may be a countertop of a modular cabinet, for example, and has arcuate channels 86 formed therein to permit the dancer pulleys to swing arcuately away from the initial position wherein the pivot axes of the dancer pulleys are aligned with the pivot axes of the pulleys 46 and 48. The pivot axes of the pulleys 46 and 48 are fixed, while the pivot axes of the dancer pulleys swing radially outwardly away from the mail passage slot formed between the two belts 44 and 58.

The end dancer pulleys 34 and 42 are also supported at the upper ends by having a cam follower 88 ride in an arcuate cam track 90 formed in an upper support bar 92. The support bar is mounted on fixed pillar supports 94, 96, 98, 100 and 102.

The pulleys 62, 64, 66, 68, 70, 72 and 60 have fixed rotational axes, while the rotational axes of the dancer pulleys, as previously mentioned, swing outwardly to expand the distance between the inner run of belt 44 and the inner run of belt 58 to accommodate mail pieces of variable thickness. When the mail piece 50 pushes the dancer pulleys outwardly, a spring bias is generated by the belt 44 which causes the dancer pulleys to return to their original positions after the mail piece 50 has passed therethrough.

In order to keep the belts 44 and 58 properly positioned on their respective pulleys, the pulleys are crowned so as to help center the belts on the pulleys. Generally speaking, if the end dancer pulleys 34 and 42 are perfectly vertical, the belt 44 should ride centered on the pulleys. However, due to the fact that the rotational axis for each of the pulleys 34 and 42 varies positionally along an arc, and since the contact between the cam tracks 90 and 91 and the cam followers 88 is not fixed, some tilting of the pivot axes for the two rollers 34 and 42 may be encountered.

Another problem associated with the drive belts which operate under the countertop is that it is difficult to remove and install the drive belts, which also run on crowned pulleys, due to the fixed rotational axes of the belt pulleys.

SUMMARY OF THE INVENTION

An object of the present invention is therefore to provide a mechanism for adjusting the vertical alignment of a dancer pulley.

Another object of the present invention is to provide an adjustment mechanism for a dancer pulley which is relatively simple in construction and effective in preventing a belt riding on the dancer pulley from moving up or down, thus remaining centered on the pulley.

Another object of the present invention is to provide a quick release belt tensioner for a drive pulley associated with a pulley assembly.

These and other objects of the invention are met by providing a dancer pulley assembly comprising a first horizontal plate having an upper surface and a lower surface, a swing arm having a proximal end pivotally mounted to the first horizontal plate on the lower surface thereof and being pivotal about a vertical pivot axis A, a second horizontal plate having an upper surface and a lower surface and being spaced vertically above the first horizontal plate by at least one vertical support, a pulley shaft having an upper end and a lower end, the lower end being mounted on a distal end of the swing arm and extending upwardly through an arcuate opening formed in the first horizontal plate, a dancer pulley rotatably mounted on the pulley shaft between the first and second horizontal plates for rotation about a vertical rotation axis B and being swingable on the swing arm through an arc defined by a distance between the pivot axis A and the rotation axis B, means for guiding the upper end of the pulley shaft during swinging motion of the dancer pulley, and means for adjusting the guide means to maintain a substantially vertical orientation of the rotation axis B.

In another aspect of the present invention, a belt release mechanism includes a support plate, a stub shaft fixedly connected to the support plate, a lever arm having first and second sides and first and second ends, the lever arm being pivotally connected to the stub shaft between the first and second ends of the lever arm and being pivotable about a vertical pivot axis C, a pulley shaft connected to the first end of the lever arm and extending in a direction opposite the stub shaft, a first belt pulley rotatably mounted on the pulley shaft and being rotatable about a rotation axis D, the first pulley being swingable about the pivot axis C, means for preventing pivotal movement of the lever arm in one direction beyond a predetermined point E, the lever arm being held at the predetermined point by belt tension imparted by a belt running from the first belt pulley to an adjacent second belt pulley having a rotation axis F, wherein the rotation axis D lies between a line connecting axes C and F and a line connecting axes E and F.

These and other objects and features of the invention will become more apparent with reference to the following detailed description and drawings.

BRIEF DESCRIPTION OF THE DRAWINGS

FIG. 3 is a top view of a dancer pulley assembly according to the present invention;

FIG. 4 is a top view of the upper plate of the dancer pulley assembly of FIG. 3;

FIG. 5 is an enlarged, exploded view, partly in section, showing the adjustment mechanism for the dancer pulley assembly according to FIG. 3;

FIG. 6 is a top view of a cam plate of the present invention;

FIG. 7 is a top view of an alternative cam plate according to the present invention;

DETAILED DESCRIPTION OF THE PREFERRED EMBODIMENTS

Figure 1:
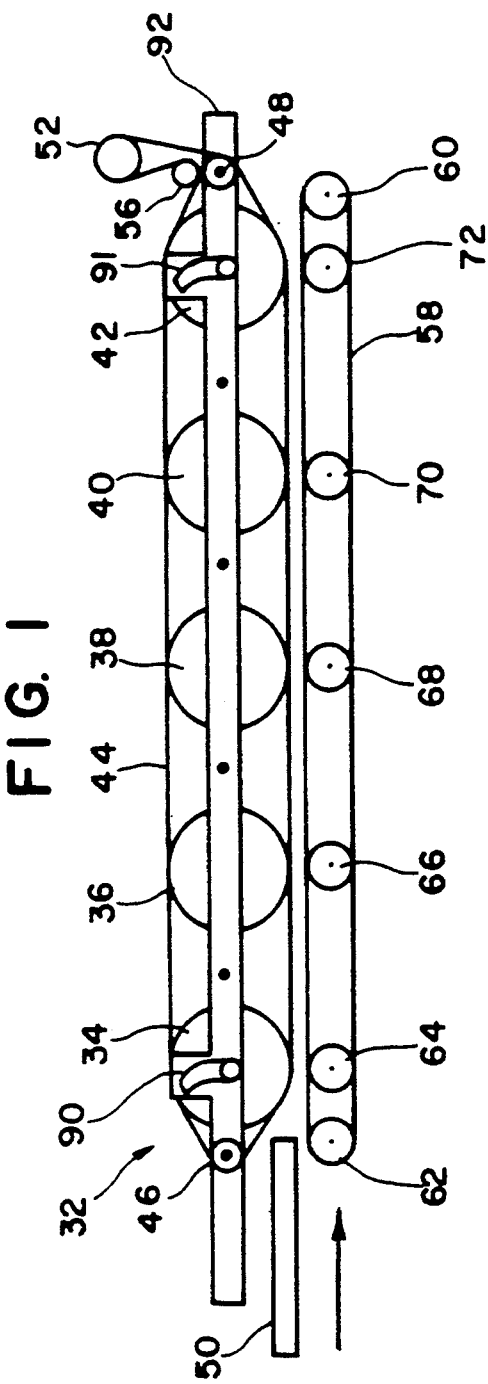
FIGS. 1 and 2 are top and side views, respectively, showing a dancer pulley assembly.
Figure 2:
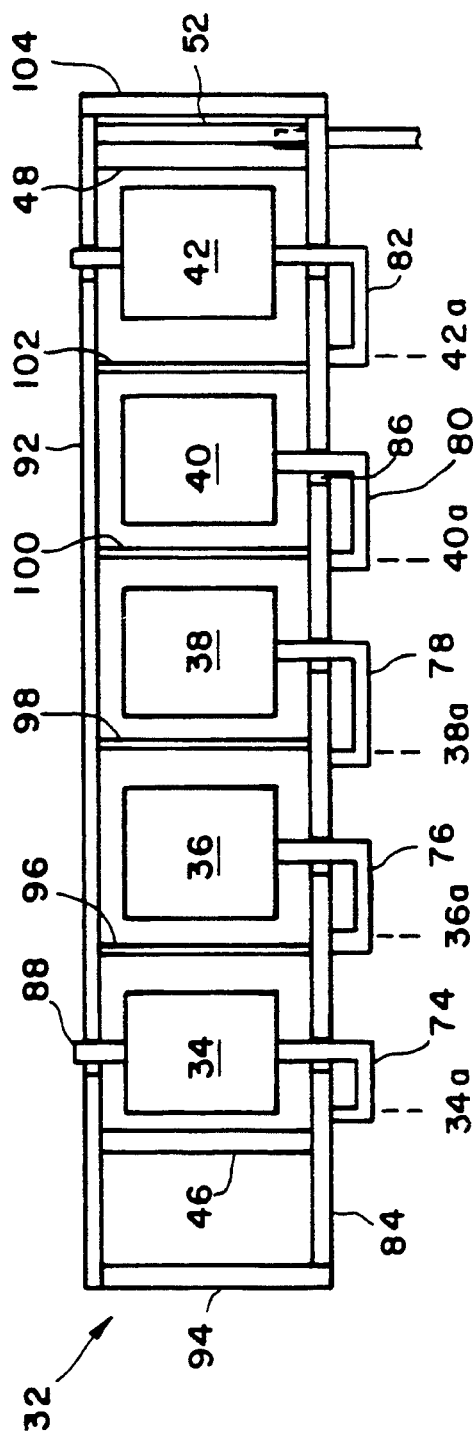

Referring now to FIG. 3, a dancer pulley assembly according to the present invention is generally referred to by the numeral 110 and is mounted to extend upwardly from a module countertop 112 which is essentially a horizontal flat surface. Dancer pulleys 114, 116, 118, 120 and 122 are arranged in a row, with pulleys 114 and 122 being at the opposite ends. A drive pulley 124 rotates a belt 126 which runs between opposite end idler pulleys 126 and 128. An additional idler 130 is provided to ensure sufficient wrap around the drive pulley 124.

Idler pulleys 132, 134, 136, 138 and 140 are disposed in a row between end pulleys 142 and 144, of which pulley 144 can be driven. The belt 146 driven between the end pulleys 142 and 144 rotates in a direction opposite the belt 126 so that mail passing between opposing runs of the two belts will be transported by virtue of the counter-rotating motion of the two belts.

A second horizontal plate 148 has an upper surface and a lower surface and is spaced vertically above the first horizontal plate or a countertop 112 by a plurality of vertical supports 150.

Figure 8A:
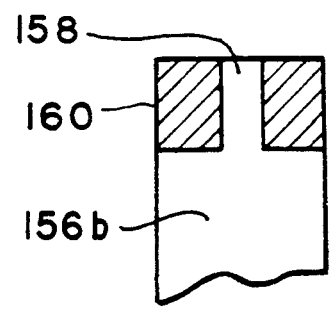
FIG. 8 is a sectional view taken along line B—B of FIG. 3.
Figure 8:
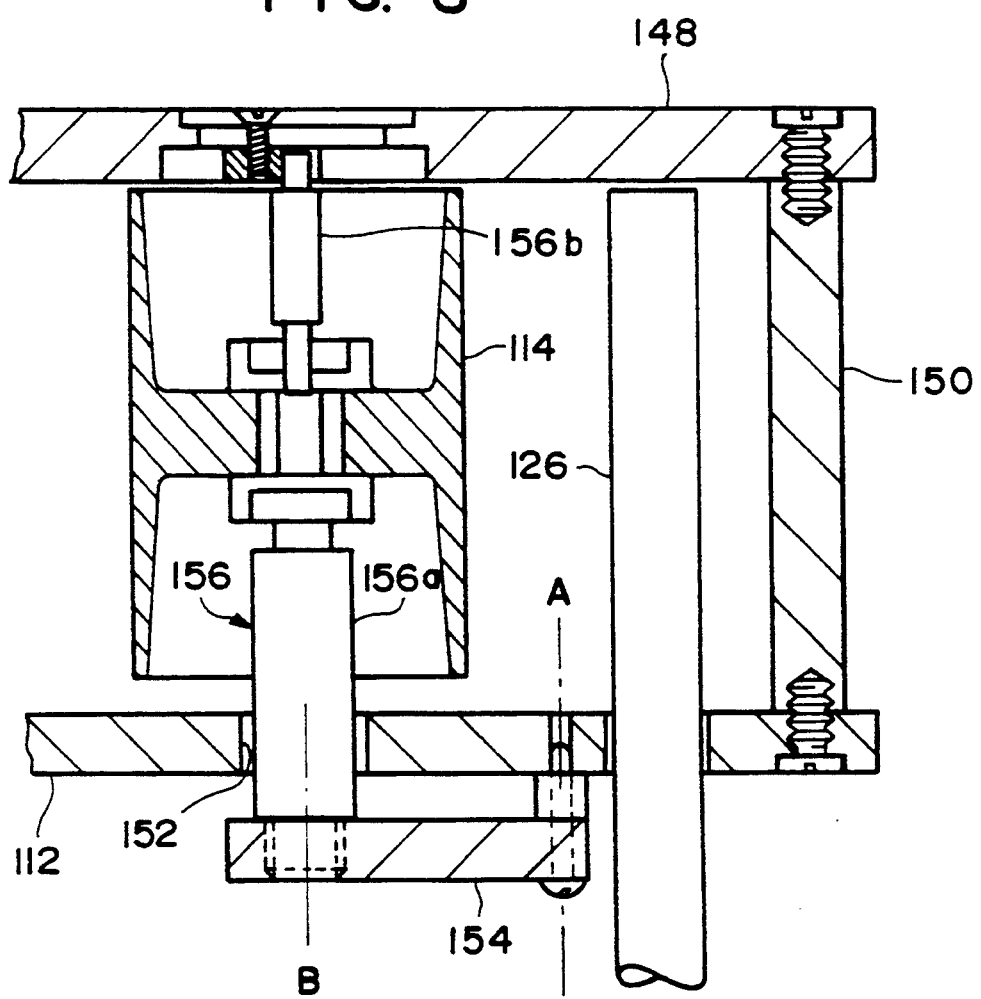

The lower plate 112 is provided with a plurality of arcuate openings 152 through which a support shaft associated with each dancer pulley is extendable and swingable. As shown in FIG. 8, the dancer pulley 114 is mounted on a swing arm 154 which is pivotally mounted at a proximal end thereof to the lower plate 112 so that the swing arm pivots about a vertical pivot axis "A".

A pulley shaft 156 has a lower portion 156a extending through the arcuate opening 152 of the lower plate 112, and an upper portion 156b which is concentric with the lower portion 156a. As shown in FIG. 8a, the upper end portion 156b of the pulley shaft 156 has a small extension 158 at the upper end thereof which receives a sleeve 160 which acts as a cam follower and is thus rotatably mounted on the end of the upper portion of the shaft 156.

The pulley shaft rotatably supports the dancer pulley 114 for rotation about an axis B. While at the same time, the pulley shaft 156 is swingable about the pivot axis A. The cam follower 160 is a sleeve which may be made of bronze, for example. If the shaft portion 156b rotates with the pulley 114, the cam follower 160 will not rotate therewith but instead will slide along the cam surface (to be described below).

If the belt 148 is tracking too high or too low, this may be indicative of a tilted pulley rotation axis B at one or both of the two end dancer pulleys 114 and 122. Thus, the present invention provides means for adjusting the guide at the upper end of the pulley shaft so that during swinging motion of the dancer pulley, the correct vertical orientation of the rotation axis B can be maintained.

Referring to FIG. 5, which is a sectional view taken along line V—V of FIG. 4, the upper plate 148 is provided with a rectangular recess 162 in the lower surface 148a of the plate 148. A pair of elongated, parallel slots 164 and 166 are formed at the opposite end portions of the upper plate 148, over the recess 162. The slot 164 is stepped so as to produce a first portion 164a and a second portion 164b. Slot 166 has the same construction. The stepped nature of the slots 164 and 166 allows passage of a shoulder screw 168 into the respective slot so as to engage a cam plate 170 having threaded bores 172 and 174. The cam follower 160 rides on the cam surface 176 of the cam plate 170. If the belt 148 is riding too high or too low, the cam plate 170 can be moved forwardly or rearwardly to correct forward or rearward tilting of the rotation axis B.

The cam surface 176 is concave to provide a sliding surface on which the cam follower 160 engages. A cam plate 178 having a convex surface 180, as illustrated in FIG. 7, is used at the opposite end.

The intermediate dancer pulleys do not require support at the upper axial ends since they do not bear as much load as the end dancer pulleys. Thus, the aforementioned adjustment mechanism need only be used on the two end dancer pulleys.

Figure 9:
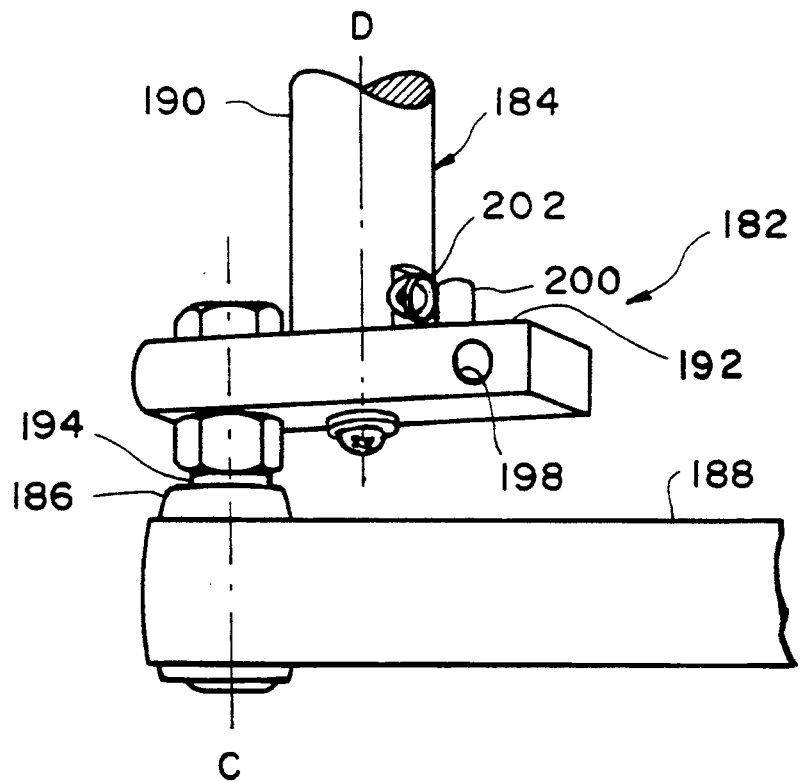
FIG. 9 is a perspective view of another embodiment of the present invention.
Figure 10:
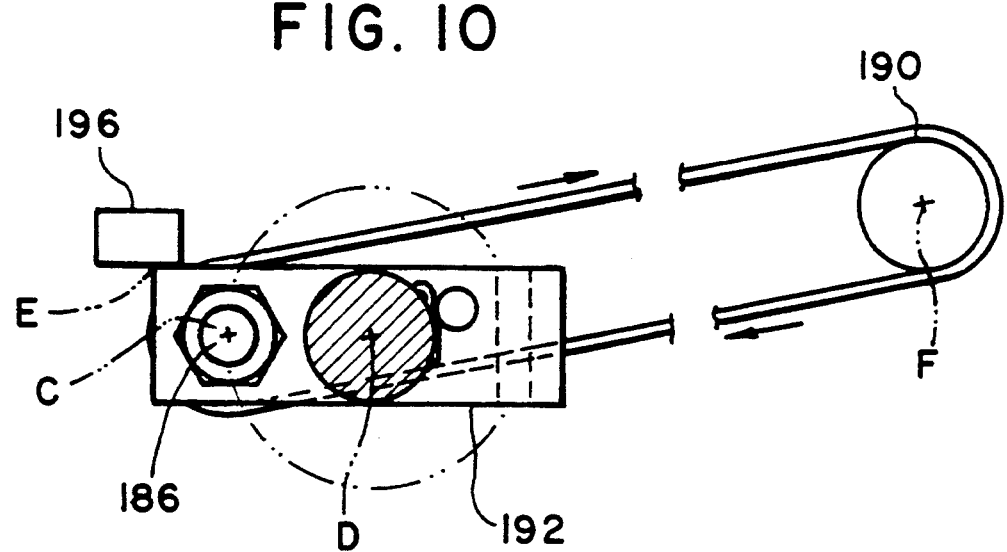
FIG. 10 is a schematic view of the embodiment of FIG. 9.

Referring now to FIGS. 9 and 10, another embodiment of the present invention provides a quick tension release mechanism, generally referred to by the numeral 182. The tension release mechanism includes an eccentric shaft 184 which supports a belt pulley 186 for rotation about an axis C. A belt 188 runs between the belt pulley 186 and an adjacent belt pulley 190. Either of these may correspond to a drive pulley, such as pulley 124. When the eccentric shaft is in the position illustrated in FIG. 9, the belt 188 is designed to be in operating tension. In order to release the belt tension to replace the belt, for example, the eccentric shaft is rotated counterclockwise as shown in FIG. 10. Belt installation can also be facilitated by rotating the eccentric shaft in the opposite direction.

The eccentric shaft includes a stub shaft 190 which is non-rotatable and which is fixedly connected to a support (not shown). A lever arm 192 is pivotally connected to the stub shaft 190 and thus pivots about a pivot axis D. A pulley shaft portion 194 is mounted on one end of the lever arm 192 and supports the belt pulley 186. It is clear that axes C and D are eccentric to each other.

The operation of the present invention is based on the fact that the lever 192 is prevented from rotation in one direction while at the same time the belt tension biases the lever in the direction where further movement is prevented by a stop. As shown in FIG. 10, belt tension biases the lever 192 in a clockwise direction, although clockwise rotation is prevented beyond the point E due to contact with an abutment 196. The abutment is a simple form of a motion limiting means. In order to release the belt tension for releasing the belt from a series of pulleys, for example, a tool such as a screwdriver can be placed in the hole 198 provided in the opposite end of the lever arm 192. The tool thus provides leverage for applying torque to the lever arm 192 in a counterclockwise direction as viewed in FIG. 10, so that initially the belt tension is increased, up to a point where the axes C, D and F are aligned. Once the axis C goes to the left side of the axis D, the belt tension biases the lever in the counterclockwise direction and further rotation reduces all of the belt tension by virtue of shortening the distance between the two pulleys 186 and 190.

Other limiting devices can be employed, such as a device carried by the lever arm 192 itself. For example, a pin 200 extending upwardly from the upper surface of the lever arm 192 can abut a stop 202 formed on the stub shaft 190. The pin and the stop 202 come into abutment when the lever has reached the limit position. The pin 200 does not abut the stop 202 when the lever is rotated in the counterclockwise direction and thus, the pin 200 and stop 202 provide a one-way limit to the amount of movement of the lever arm in one direction.

Numerous modifications and adaptations of the present invention will be apparent to those so skilled in the art and thus, it is intended to cover all such modifications and adaptations which fall within the true spirit and scope of the invention.

What is claimed is:

1. A tension release mechanism for changing belts in a dancer pulley assembly of a mail sorting system comprising:

a stub shaft fixedly connected to a support member;

a lever arm having first and second sides and first and second ends, the lever arm being pivotally connected to the stub shaft between the first and second ends of the lever arm and being pivotal about a vertical pivot axis D;

a pulley shaft connected to the first end of the lever arm and extending in a direction opposite the stub shaft;

a first belt pulley rotatably mounted on the pulley shaft and being rotatable about a rotation axis;

means for preventing pivotal movement of the lever arm in one direction beyond a predetermined point E, the lever being held at the predetermined point E by belt tension imparted by a belt running from the first belt pulley to an adjacent second belt pulley having a rotation axis F, wherein the rotation axis C lies between a line connecting axes D and F and a line connecting point E and axis F.

2. A tension release mechanism according to claim 1, wherein the lever includes a hole formed in the second end thereof the hole receiving a tool for applying a torque to the lever.

3. A tension release mechanism according to claim 1, wherein the preventing means comprises a stop mounted on the stub shaft and a pin mounted on the lever arm for abutting the stop at the predetermined point E.

* * * * *